United States Patent [19]
Korkut

[11] 3,868,760
[45] Mar. 4, 1975

[54] METHOD OF ORTHOGONALLY CONNECTING LONG STRUCTURAL MEMBERS OF CIRCULAR AND RECTANGULAR CROSS-SECTION

[76] Inventor: Mehmet D. Korkut, 3848 Veterans Hwy., New Orleans, La. 70002

[22] Filed: Sept. 7, 1973

[21] Appl. No.: 395,211

[52] U.S. Cl. ............... 29/470, 29/469, 29/470.5, 29/471.1
[51] Int. Cl. ..................................... B23k
[58] Field of Search .......... 29/470, 471.1, 462, 469, 29/471.3, 473.3, 470.5

[56] References Cited
UNITED STATES PATENTS

| | | | |
|---|---|---|---|
| 1,992,710 | 2/1935 | Matthaei | 29/486 X |
| 2,113,403 | 4/1938 | Harmon | 280/106 |
| 2,219,599 | 10/1940 | Penote | 29/470 X |
| 2,495,333 | 1/1950 | Kraeft et al. | 29/469 |
| 3,095,908 | 7/1963 | Plummer | 29/469 X |
| 3,498,407 | 3/1970 | Straw | 29/469 X |
| 3,651,776 | 3/1972 | Hopeman, Jr. | 29/469 X |
| 3,751,792 | 8/1973 | Frakes | 29/471.1 |

Primary Examiner—C. W. Lanham
Assistant Examiner—Victor A. Di Palma
Attorney, Agent, or Firm—James B. Lake, Jr.

[57] ABSTRACT

At an intersection, internally framing with orthogonal framing elements a hollow box structural member of rectangular cross-section, and fixing to both framing elements and box member a plurality of plate flanges in transversely spaced alignment, said plate flanges extending outwardly toward an orthogonally intersecting tubular structural member of circular cross-section to define respective arcs of less than 180° and of the external radius of said tubular member. Placing the tubular member in the arcs of less than 180° of the external flanges. Externally framing the tubular member with the same number of external frames as external flanges, said external frames being longitudinally spaced in alignment with the transversely spaced flanges of the box member, by assembling peripheral segments for each external frame, each segment defining an arc of less than 180° and being of the same radius as the arcs defined by said flanges, the combination of all the segments and arcs annularly enclosing the tubular member to complete with orthogonal fastening an orthogonal connection of the box and tubular members.

3 Claims, 4 Drawing Figures

SECT. 3   SECT. 3A

METHOD OF ORTHOGONALLY CONNECTING LONG STRUCTURAL MEMBERS OF CIRCULAR AND RECTANGULAR CROSS-SECTION

The invention relates generally to a method of orthogonally connecting long hollow members, and more particularly to connecting hollow structural members of rectangular and circular cross-section respectively.

Heretofore, the practice has been to insert a tubular member through a box member thereby weakening the box member and also requiring non-orthogonal bracing.

It is an object of the invention to provide a fully orthogonal connection of orthogonal fastenings.

Figure 1:
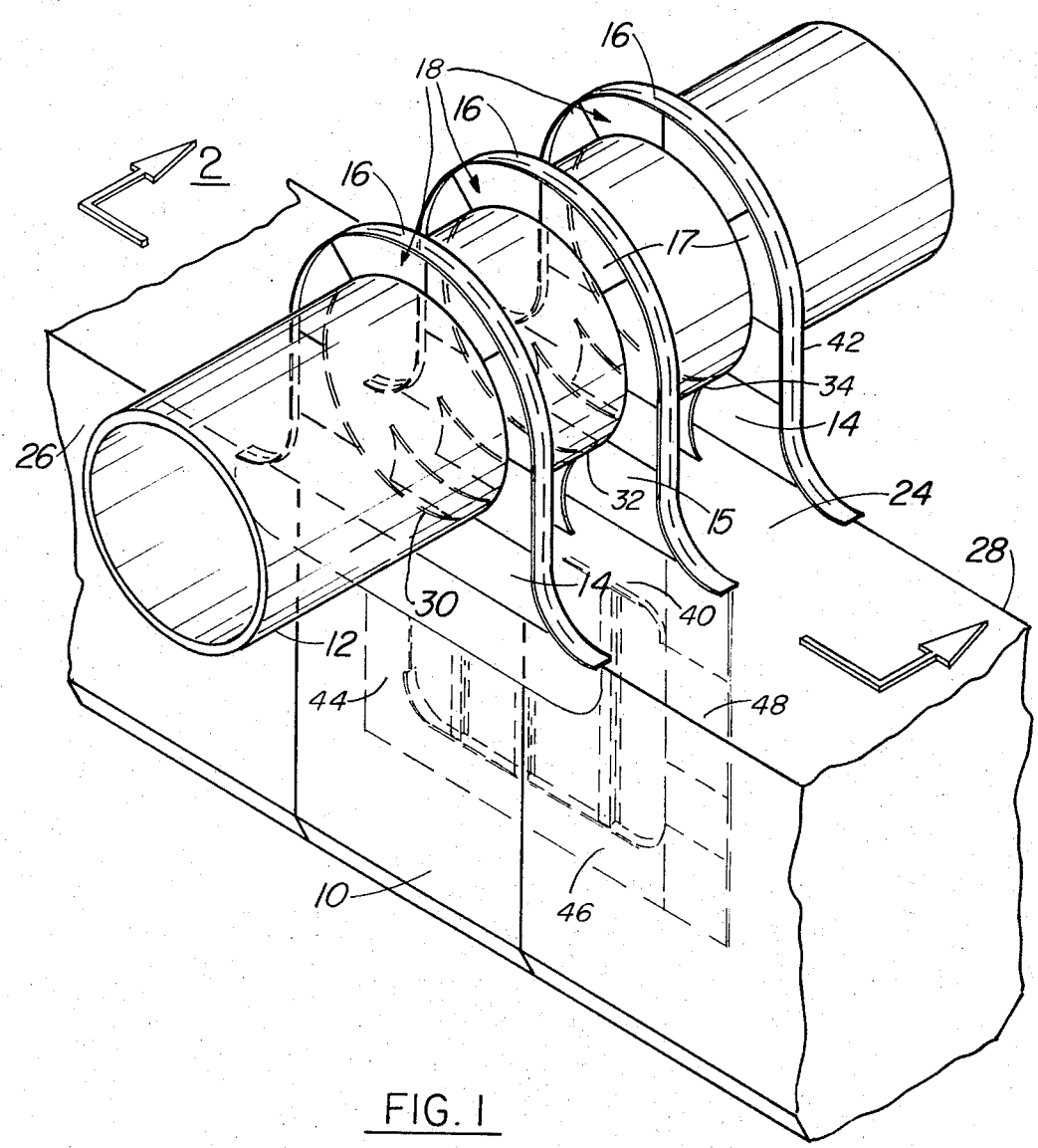
Figure 2:
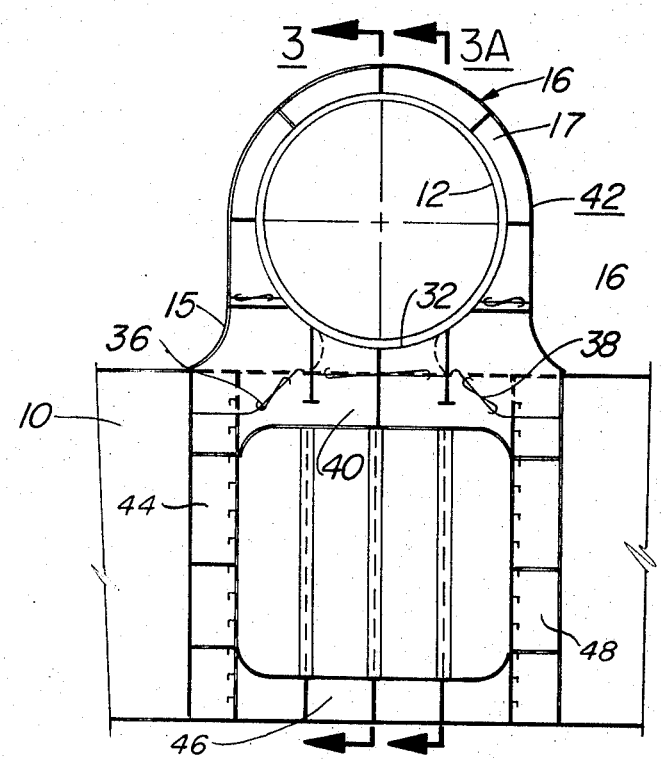
Figure 3:
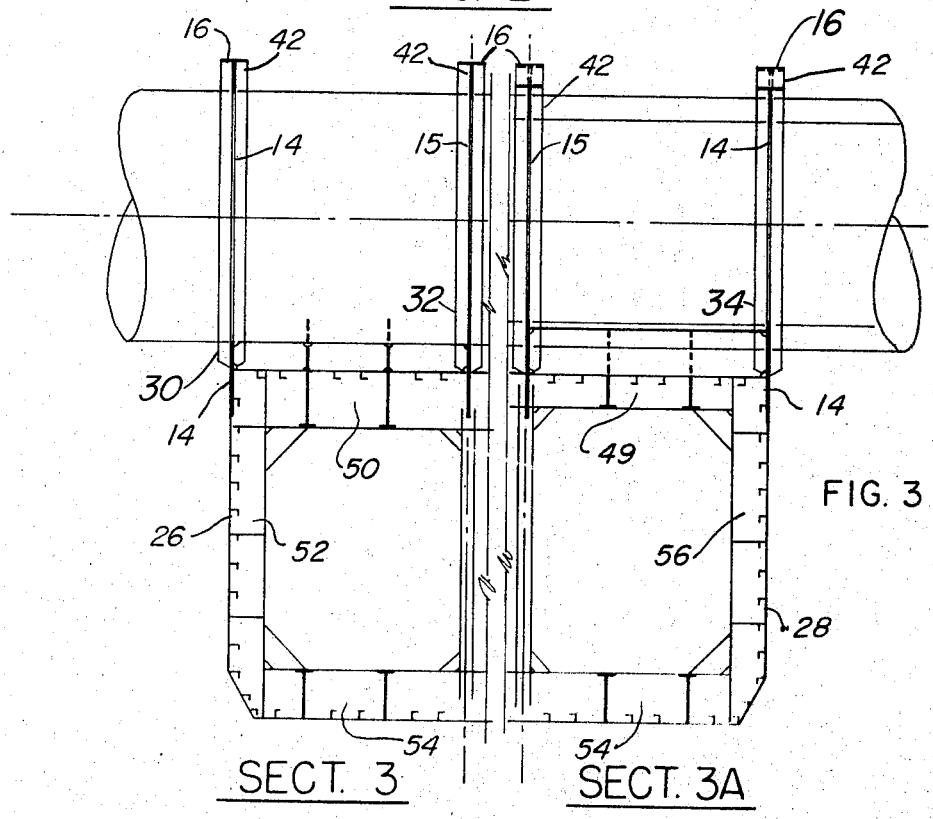

Other objects and a more complete understanding of the invention may be had by referring to the accompanying specifications, claims and drawings in which:

FIG. 1 is a three dimensional view showing an orthogonal connection of the invention, FIG. 2 is a cross-sectional view taken along section lines 2—2 of FIG. 1, and FIG. 3 is a composite cross-sectional view taken along section lines 3—3 and 3A—3A.

Referring to FIG. 1, the invention comprises a method of orthogonally connecting a box member 10 to a tubular member 12. External flanges 14 and 15 are transversely spaced across the width of box member 10 at a place of proposed connection and fixed in parallel thereon. External curved frames 16 are assembled and seam welded (see FIG. 2) on said flanges from a plurality of peripheral segments 17 to form partially annular structure 18, having a longitudinal axis normal to the longitudinal axes of each of said external flanges, and in annular combination with said external flanges 14 and 15 is for confining tubular member 12 in said annular combination, and thereby connecting it orthogonally or at right angles with box structure 10.

Referring further to FIGS. 2 and 3, the three external flanges 14 and 15 are further illustrated; two flanges 14 project outwardly and parallel from top 24 of box member 10 and respectively flush with opposite adjacent sides 26 and 28, and one flange 15 is spaced between flanges 14 on said box member and parallel to the other flanges. The upper edges of all external flanges 14 and 15 respectively define center arcs 30, 32 and 34 having the common external radius of tubular member 12 for supporting said member therein. Flanges 14 have depending sides that are thicker than, but also act as a part of, respective sides 26 and 28 of the box member to which they are seam welded in external flush congruency. Intermediate external flange 15 has depending serations 36 and 38 which are seam welded into a top reinforcing truss 40 and into top 24 of box member 10.

With tubular member 12 seated in center arcs 30, 32, and 34 of the respective flanges 14 and 15 peripheral segments 17 are assembled and seam welded on said flanges to form composite frames 16 which, in cooperation with external flanges 14 and 15 enclose tubular member 12 and orthogonally connect it to box member 10.

Peripheral segments 17 and external flanges 14 and 15 forming annular structure 18 are respectively stiffened by outer rims 42 fixed to the outer edges of the constituent peripheral segments. Outer rims 42 are in continuous abutting relation with each of respective composite frames 16 and are respectively welded thereto to provide strength and stiffness to composite frames 16 and annular structure 18.

Referring to the figures, box member 10 is internally braced or framed longitudinally for the length of the respective flanges by trusses 40, 44, 46 and 48, and transversely by 50, 52, 54 and 56. The various trusses are respectively fastened at right angles or orthogonally to each other, and the respective frames they define are at right angles or orthogonal to each other, thereby making an orthogonal connection of box and tubular members with orthogonally fastened truss, and framing members.

What is claimed is:

1. The method of orthogonally connecting two longitudinal hollow structural members comprising the steps of:
   a. framing one of said members with interior orthogonally connected trusses, said framing extending longitudinally and transversely therein for the length and width of a connection, said trusses being secured in said one member as a part thereof;
   b. Fastening, respectively, external flanges to said longitudinally extending framing to project parallel and outwardly from said one member in transversely spaced apart alignment, said flanges respectively defining center indentations having a common axis transverse said one member, said center indentations being adapted to conform to the external cross-sectional shape of the other of said members;
   c. Placing said other member in said indentations with its place of connection extending therein, thereby placing said other member in normal or orthogonal juxtaposition with said one member; and
   d. Assembling and fixing peripheral segments together and to said respective external flanges to externally frame said other member and connect it with said one member orthogonally or at right angles therewith.

2. The method of orthogonally connecting two longitudinal hollow structural members as described in claim 1 wherein one of said members has a rectangular cross-section and the other has a circular cross-section.

3. The method of orthogonally connecting two longitudinal hollow structural members as described in claim 1 wherein the step of assembling and fixing peripheral segments together and to said respective external flanges includes orthogonally fixing respective rims to peripheries defined thereby.

* * * * *